(12) United States Patent
Riise et al.

(10) Patent No.: US 12,118,997 B1
(45) Date of Patent: Oct. 15, 2024

(54) USE OF RELATIVE TIME OF RECEIPT OF VOICE COMMAND AS BASIS TO CONTROL RESPONSE TO VOICE COMMAND

(71) Applicant: Roku, Inc., San Jose, CA (US)

(72) Inventors: Soren Riise, San Jose, CA (US); Frank Maker, Livermore, CA (US); Carl Sassenrath, Reno, NV (US); Abhay Bhorkar, Cupertino, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/197,880

(22) Filed: May 16, 2023

(51) Int. Cl.
  *G10L 15/22* (2006.01)
  *G10L 15/32* (2013.01)
(52) U.S. Cl.
  CPC ............ *G10L 15/22* (2013.01); *G10L 15/32* (2013.01)
(58) Field of Classification Search
  CPC .... G10L 15/22; G10L 2015/223; G10L 15/32
  See application file for complete search history.

(56) References Cited

U.S. PATENT DOCUMENTS

| | | | | |
|---|---|---|---|---|
| 10,388,273 | B2* | 8/2019 | Garner | G10L 15/08 |
| 10,643,609 | B1* | 5/2020 | Pogue | G10L 15/18 |
| 2015/0039319 | A1* | 2/2015 | Mei | G10L 21/00 704/275 |
| 2017/0098457 | A1* | 4/2017 | Zad Issa | G10L 25/78 |
| 2017/0133011 | A1* | 5/2017 | Chen | H04L 67/306 |
| 2019/0172464 | A1* | 6/2019 | Bargetzi | G10L 15/22 |
| 2020/0294503 | A1* | 9/2020 | Ryu | H04L 67/125 |
| 2021/0074283 | A1* | 3/2021 | Park | G10L 15/20 |
| 2021/0375267 | A1* | 12/2021 | Patil | G10L 15/07 |
| 2022/0230634 | A1* | 7/2022 | Shelke | G10L 15/005 |
| 2022/0351723 | A1* | 11/2022 | Oh | G10L 15/30 |

OTHER PUBLICATIONS

P. Ferrari, et al., "Non invasive Time Synchronization for ZigBee Wireless Sensor Networks," ISPCS 2008—International IEEE Symposium on Precision Clock Synchronization for Measurement, Control and Communication, Sep. 22-26, 2008.
D. Cox, et al., "Time Synchronization for ZigBee Networks," pp. 135-138, IEEE, 2005.

* cited by examiner

*Primary Examiner* — Mark Villena
(74) *Attorney, Agent, or Firm* — McDonnell Boehnen Hulbert & Berghoff LLP

(57) ABSTRACT

A method and system for controlling response to a voice-command utterance. An example method includes a computing system that is associated with the first device carrying out operations upon the first device receiving the voice-command utterance. The operations include (a) making a determination of whether any of one or more second devices received the voice-command utterance before the first device received the voice-command utterance and (b) controlling whether the computing system will trigger an action in response to the first device receiving the voice-command utterance, with the controlling being based on the determination of whether any of the one or more second devices received the voice-command utterance before the first device received the voice-command utterance. In an example implementation, the action could be controlling operation of a control target such as one or more lights.

20 Claims, 5 Drawing Sheets

USE OF RELATIVE TIME OF RECEIPT OF VOICE COMMAND AS BASIS TO CONTROL RESPONSE TO VOICE COMMAND

SUMMARY

Modern customer premises, such as homes, hotels, or offices, may be equipped with a number of voice-capable devices having voice user interfaces (VUIs) that allow users to interact by voice with the devices to facilitate triggering useful operations. For instance, these devices may include microphones to receive spoken voice commands from users and may include or be configured to interact with associated computing systems that are arranged to apply speech recognition to translate these voice commands to text or other data representations and to respond to the voice commands by carrying out associated actions.

By way of example, representative customer premises may include a number of "smart home" or "Internet of Things" (IoT) devices, some of which may be voice-capable devices that allow voice control over operation of the devices themselves and/or over operation of other devices or systems. These voice-capable devices may take various forms, examples of which include, without limitation, smart speakers, switches, power outlets, thermostats, appliances, security systems, gaming systems, media players, lights, fans, window treatment, furniture, or the like.

A voice-capable device with its associated computing system may be configured to detect and respond to utterance of a voice command in various ways.

Without limitation, for instance, the voice-capable device may regularly receive acoustic audio input from its environment, digitize the audio, and apply a voice-recognizer (e.g., an application specific integrated circuit) to monitor for and detect presence in the received audio of an utterance of a predefined wakeup phrase such as "Hey Device!" or the like. Further, once the voice-capable device detects utterance of the predefined wakeup phrase, or otherwise, its associated computing system may evaluate the received audio to detect in the received audio an utterance of a particular voice command such as "Turn on the lights", "Turn up the temperature", "Lower the shades", "Tell me the weather", or the like. For example, the computing system may use advanced artificial intelligence (AI) technology to recognize speech, parsing and analyzing associated speech components to determine a user's intent defining the voice command, and may then trigger (e.g., take or cause to be taken) an appropriate action in response to the voice command.

The computing system in this arrangement could be provided as part of the voice-capable device and/or in one or more separate devices or systems. For instance, the voice-capable device may have one or more processors configured to evaluate the received audio, to detect in the audio a particular voice command, and to trigger responsive action. Alternatively or additionally, the voice-capable device may have one or more processors configured to detect received speech audio and to transmit that detected speech audio or a representation of the speech audio to a separate computing system, and the separate computing system may have one or more processors configured to evaluate the speech audio in order to detect utterance of a particular voice command and to trigger responsive action. Other arrangements are possible as well.

The action that gets triggered in response to an uttered voice command may involve controlling operational state of one or more "control targets." A control target may be the voice-capable device itself, in which case the voice command received by the voice-capable device may result in controlling operational state of the voice-capable device. For instance, if the voice-capable device is a fan, a voice command such as "Increase fan speed" may result in increasing speed of the fan itself. Alternatively or additionally, a control target may be a separate device, in which case the voice command received by the voice-capable device may result in controlling operational state of that separate device. For instance, if the voice-capable device is a light switch, a voice command such as "Turn on the lights" may result in turning on separate lights that are paired with that switch.

The computing system that processes voice commands received by a voice-capable device may be pre-provisioned with mapping data (e.g., a mapping table or other control logic) that correlates each of one or more voice commands respectively with one or more actions to be taken in response to the voice command. This mapping data may establish respectively for each of such voice command one or more associated action parameters such as (i) an identity of an associated control target and (ii) one or more actions to be taken with respect to operational state of the associated control target.

Thus, when the voice-capable device receives a given such voice command, its associated computing system may refer to this mapping data to determine what action is to be taken in response and may then trigger that determined action. By way of example, if the voice command is to make a particular change to operational state of a particular control target, the computing system may provide a control signal that triggers that particular change in operational state of that particular control target. For instance, if a voice-capable switch receives the voice command "Turn on the lights," the computing system may generate and transmit to one or more paired lights a control signal that is interpretable by the lights to cause the lights to turn on, or the computing system may cause the switch to generate and transmit such a control signal. As another example, if a voice-capable thermostat receives the voice command "Make it warmer," the computing system may provide a control signal that causes a temperature setting of the thermostat to increase.

Unfortunately, one technical problem that may arise in some situations is that multiple voice-capable devices may be located within earshot of a person speaking a voice command, and so each device's receipt of that spoken voice command may result in triggering action in response, even though the person speaking the voice command intended the voice command to be processed by just one of the voice-capable devices. This may create user-experience issues or other issues.

As an example, consider a scenario where a house contains multiple voice-capable switches each paired with a respective set of lights, but where two or more such switches are within earshot of a person uttering the voice command "Turn on the lights." For instance, the house may have two adjacent rooms R1 and R2 each containing (i) a respective set of lights and (ii) a respective voice-capable switch for controlling those lights. If a person is in room R1 near the voice-capable switch in the room and utters the voice command "Turn on the lights," the processing system associated with that voice-capable switch may detect that utterance of that voice command and may therefore cause the lights in room R1 to turn on. However, if the person's utterance of that voice command is loud enough to also be received by the voice-capable switch in room R2, then the processing system associated with that voice-capable switch may also detect that utterance of the voice command and may therefore cause the lights in room R2 to turn on as well—which was not the person's intent.

As another example, consider a scenario where a house contains multiple voice-capable thermostats but where two or more such thermostats are within earshot of a person uttering the voice command "Make it warmer." For instance, the house may have two heating, ventilation, and air-conditioning (HVAC) zones Z1 and Z2 each containing a respective voice-capable thermostat for controlling temperature in the zone. If a person is in zone Z1 near the voice-capable thermostat in that zone and utters the voice command "Make it warmer," the processing system associated with that voice-capable thermostat may detect utterance of that voice command and may therefore cause the temperature setting of the thermostat in zone Z1 to be increased. However, if the person's utterance of that voice command is loud enough to also be received by the voice-capable thermostat in zone Z2, then the processing system associated with that voice-capable thermostat may also detect that utterance of the voice command and may therefore cause the temperature setting of the thermostat in zone Z2 to be increased as well—which was, likewise, not the person's intent.

Disclosed is a technical solution to help address this problem. In particular, disclosed is a mechanism to help address a scenario where multiple voice-capable devices receive an voice-command utterance that was intended for just one of the voice-capable devices, and where the issue is therefore which of the voice-capable devices was the intended recipient of the voice-command utterance and thus which voice-capable device's receipt of the voice-command utterance should trigger associated action (and/or which other voice-capable device's receipt of the voice-command utterance should not trigger associated action).

In accordance with the disclosure, this issue can be resolved by taking into account a time of receipt of the voice-command utterance respectively at each voice-capable device, considering that the voice-capable device that is first to receive the voice-command utterance is likely the intended recipient of the voice-command utterance.

In an example implementation, multiple voice-capable devices that could be subject to this process may have tightly time-synchronized clocks, to facilitate a fair comparison of their respective times of receipt of a given voice-command utterance. The devices' clocks could be synchronized in various ways, such as through WiFi or other electromagnetic signaling with each other and/or with a reference clock source, among other possibilities.

The voice-capable devices may then use their time-synchronized clocks as a basis to determine and record their respective times of receipt of a voice-command utterance, and a computing system may use one or more such recorded times of receipt of the voice-command utterance as a basis to decide which voice-capable device was the first to receive the voice-command utterance and therefore which voice-capable device's receipt of the voice-command utterance should result in triggering of responsive action (and/or which other voice-capable device's receipt of the voice-command utterance should not result in triggering of responsive action).

This process could be carried out in a distributed or centralized manner.

In a distributed system, for instance, each voice-capable device's associated computing system may be configured such that, when the voice-capable device receives a voice-command utterance, the computing system may store the device's time of receipt of the voice-command utterance and may also broadcast or multicast messaging that indicates the device's time of receipt of the voice command. Each voice-capable device's associated computing system may then determine based on its stored time of receipt and such broadcast or multicast messaging whether any other voice-capable device received the voice-command utterance earlier and may accordingly control whether or not to trigger responsive action.

For instance, if a given device's associated computing system determines from such messaging that another device received the voice-command utterance earlier than the given device, then, based at least on that determination, the given device's computing system may forgo triggering action in response to the given device's receipt of the voice-command utterance. And otherwise, the given device's associated computing system may trigger action in response to the given device's receipt of the voice-command utterance.

In a centralized system, on the other hand, each voice-capable device's associated computing system may be configured such that, when the voice-capable device receives a voice-command utterance, the computing system will report to a centralized computing system an indication of the device's time of receipt of the voice-command utterance. Based on this reporting from one or more such devices, the centralized computing system may then determine which device received the voice command first and may responsively signal to that device's associated computing system to cause that device's associated computing system to trigger responsive action.

For instance, if the centralized computing system receives such reports from two or more voice-capable devices, then the computing system may compare the indicated times of receipt of the voice-command utterance, to determine which device receive the voice command first, and the centralized computing system could signal to that device's associated computing system to cause that device's associated computing system to trigger the action in response to that device's receipt of the voice-command utterance. Alternatively, if the centralized computing system receives such a report from just one voice-capable device, then the centralized computing system could conclude that no contest exists and could responsively signal to that device's associated computing system to cause that device's associated computing system to trigger action in response to that device's receipt of the voice-command utterance.

Further, a hybrid of these approaches could be possible as well. For instance, the centralized computing system could be a given computing system associated with a given one of the voice-capable devices. In that scenario, the given computing system could record the given device's time of receipt of the voice-command utterance, and, for each other voice-capable device that receives the voice-command utterance as well, the other device's associated computing system could report to the given computing system the other device's time of receipt of the voice command. The given computing system may thus determine a winning device in the manner discussed above and could accordingly cause that device's computing system (possibly the given computing system itself) to trigger responsive action.

These as well as other aspects, advantages and alternatives will become apparent from reading the following detailed description with reference where appropriate to the accompanying drawings. Further, it should be understood that the implementations described in this summary and in the following description and drawings are intended as examples only and that numerous variations could be possible.

DETAILED DESCRIPTION

Figure 1:
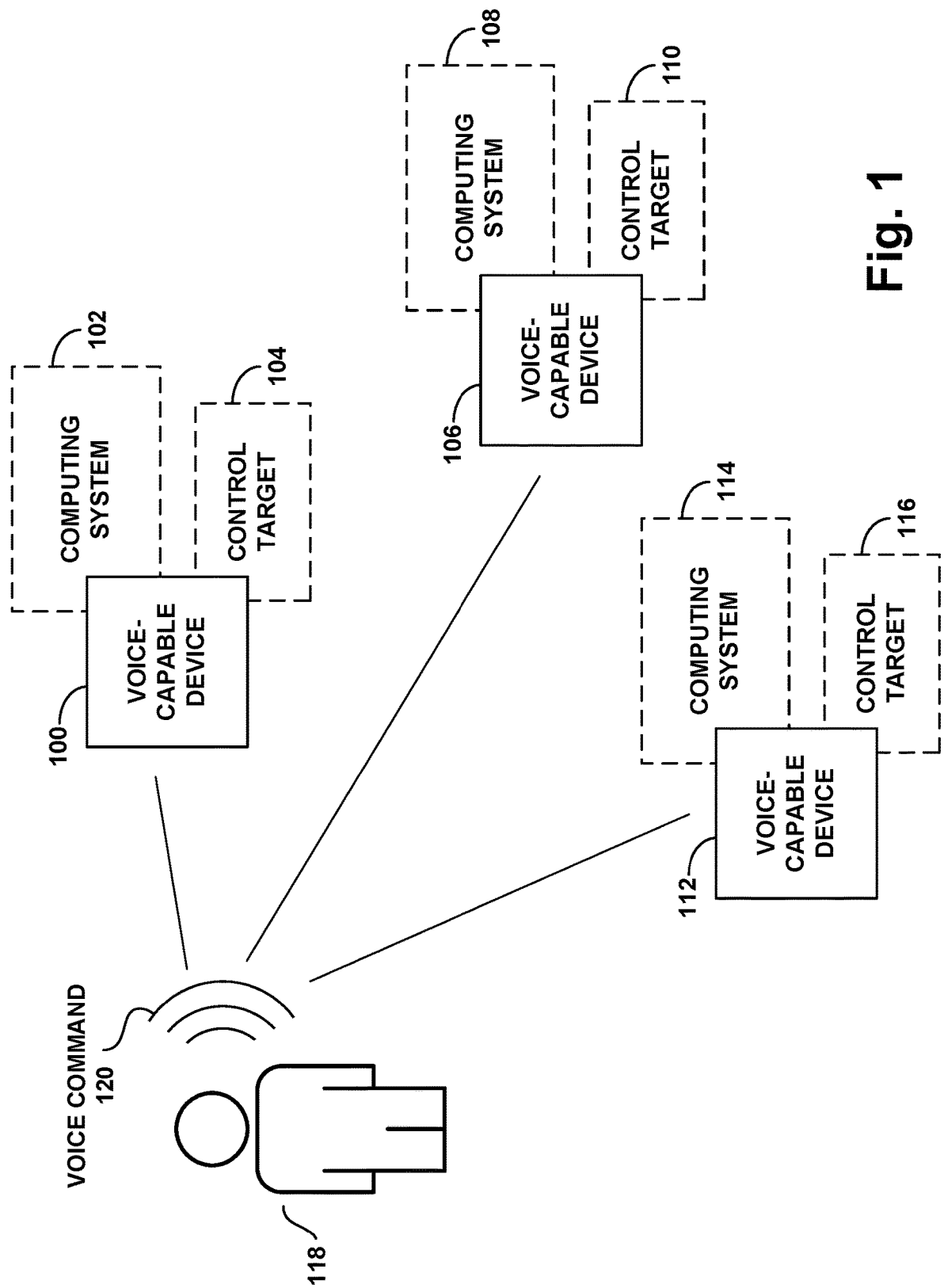
FIG. 1 is a simplified block diagram illustrating an example arrangement in which multiple voice-capable devices are configured to receive voice commands in order to facilitate triggering of associated action.

Referring to the drawings, as noted above, FIG. 1 is a simplified block diagram illustrating an example arrangement including multiple voice-capable devices that are configured to receive voice commands in order to facilitate triggering of associated action.

It will be understood that this and other arrangements and processes described herein could take various other forms. For instance, elements and operations could be re-ordered, distributed, replicated, combined, omitted, added, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units executing program instructions stored in memory, among other possibilities.

The example arrangement of FIG. 1 includes three example voice-capable devices, each having an associated example computing system and each having an associated example control target to be controlled by voice-command input to the device. In particular, the figure shows a first voice-capable device 100 having an associated computing system 102 and having an associated control target 104 to be controlled by voice-command input to device 100, a second voice-capable device 106 having an associated computing system 108 and having an associated control target 110 to be controlled by voice-command input to the device 106, and a third voice-capable device 112 having an associated computing system 114 and having an associated control target 116 to be controlled by voice-command input to the device 112. Without limitation, these voice-capable devices could be positioned in various rooms of example customer premises.

As noted above, the example computing systems 102, 108, 114 shown associated respectively with the example voice-capable devices 100, 106, 112 may be included in the voice-capable devices themselves and/or in one or more separate devices or systems. For instance, each voice-capable device may include its own computing system configured to carry out various associated processing operations and/or may interact with a separate computing system that may be configured to carry out some or all of the associated processing operations.

Furthermore, although the figure shows the three voice-capable devices 100, 106, 112 having separate respective computing systems 102, 108, 114, some or all aspects of those computing systems 102, 108, 114 may be integrated together. For instance, the voice-capable devices 100, 106, 112 may interact with a common centralized computing system to facilitate carrying out respective associated processing operations.

Likewise, the example control targets 104, 110, 116 shown associated respectively with the example voice-capable devices 100, 106, 112 may also be included in the voice-capable devices and/or may be separate from the voice-capable devices. Considering the examples discussed above, for instance, a voice-capable device such as a thermostat may itself be voice-controllable and may thus effectively be or include its own control target. Whereas, a voice-capable device such as a switch may control one or more other devices such as one or more lights, which may be separate control targets. Other examples are possible as well.

FIG. 1 also shows an example person 118 positioned relatively close to voice-capable device 100 and relatively far from each of voice-capable devices 106, 112. And the figure shows the person 118 uttering a voice command 120.

This voice command 120 may be a voice command that all of the voice-capable device's associated computing systems 102, 108, 114 are configured to respond to by triggering associated action. For instance, the computing system 102 associated with voice-capable device 100 may be configured to respond to voice-capable device 100 receiving that voice-command utterance 120 by triggering a change in operational state of the control target 104 associated with that voice-capable device 100, the computing system 108 associated with voice-capable device 106 may be configured to respond to voice-capable device 106 receiving that same voice command by triggering a change in operational state of the control target 110 associated with that voice-capable device 106, and the computing system 114 associated with voice-capable device 112 may be configured to respond to voice-capable device 12 receiving that same voice command by triggering a change in operational state of the control target 116 associated with that voice-capable device 112

In this arrangement, as the person 118 is close to voice-capable device 100, the person 118 may intend for the voice command 120 to be received and processed by that particular voice-capable device 100. Indeed, when the person 118 utters the voice command 120, voice-capable device 100 may receive the voice-command utterance 120, and the computing system 102 associated with voice-capable device 100 may evaluate the received voice-command utterance 120, determine that the operational state of control target 104 should be changed in response to the voice-command utterance 120, and trigger that change in operational state of the control target 104.

However, if the person 118 utters the voice command 120 loudly enough, then the voice command 120 may also be received by each of the other, more distant voice-capable devices 106, 112 and, contrary to the person's intent, may result in a change in operational state of control targets 110 and 116 too. For instance, when the person 118 utters the voice command 120 loudly enough, voice-capable device 106 may also receive the voice-command utterance 120, and the computing system 108 associated with voice-capable device 106 may evaluate the received voice-command utterance 120, determine that the operational state of control target 110 should be changed in response, and trigger that change in operational state of control target 110. Further, when the person 118 utters the voice command 120 loudly enough, voice-capable device 112 may also receive the voice-command utterance 120, and the computing system 108 associated with voice-capable device 112 may evaluate the received voice-command utterance 120, determine that the operational state of control target 116 should be changed in response, and trigger that change in operational state of control target 116.

This problem is not limited to a scenario where there are three voice-capable devices. The same problem may occur if there are just two voice-capable devices or if there are more than three voice-capable devices As noted above, this problem could be addressed by taking into account the respective times of receipt of the voice-command utterance 120 at voice-capable devices, to determine which voice-capable device received the voice-command utterance 120 first and thus to control which voice-capable device's associated computing system should trigger action in response to the voice-command utterance 120 (and/or which voice-capable device's associated computing system should not trigger action in response to the voice-command utterance 120).

In particular, this solution leverages the fact that sound travels at roughly 1.13 feet per millisecond and thus roughly one foot every 0.89 milliseconds. So for each foot of distance that the person 118 who utters the voice command 120 is closer to a given voice-capable device than to another voice-capable device, the given voice-capable device may receive the voice-command utterance 120 roughly 0.89 milliseconds earlier than the other voice-capable device would receive the voice-command utterance 120.

To facilitate using the devices' times of receipt of the voice-command utterance 120 as a basis to determine which voice-capable device received the voice-command utterance 120 first and thus which voice-capable device's associated computing system should trigger action in response to the voice-command utterance 120, the voice-capable devices 100, 106, 112 could be configured respectively with clocks that are tightly synchronized with each other, in a manner that can provide a common frame of reference for establishing their respective times of receipt of the voice-command utterance and for comparing those respective times of receipt.

Considering that sound travels roughly 1.13 feet per millisecond, this time synchronization would preferably be highly accurate at a millisecond or sub-millisecond (e.g., microsecond) level, to facilitate comparing times of receipt of the voice command at devices that may be relatively close to each other.

As noted above, one way to achieve this time synchronization among the devices is through use of WiFi or other electromagnetic signaling between the devices. For devices that are relatively nearby each other, the propagation delay of an electromagnetic signal between the devices is, for present purposes, negligible. Thus, as to devices 100, 106, 112, if one device broadcasts a WiFi frame and each other device receives that broadcast WiFi frame, that transmission and reception could define a common time point for the devices, which the devices could use as a basis to synchronize their local clocks.

To facilitate this WiFi-based synchronization process, each of the devices 100, 106, 112 could be equipped with a respective WiFi communication interface including a WiFi radio, antenna, and associated circuitry, and each of the devices 100, 106, 112 could further be equipped with processing logic for engaging in ad hoc WiFi communication with each other, to establish a common time frame of reference. For instance, each device's associated computing system may include one or more processing units (e.g., digital signal processors) at the device, configured to engage in this process though the device's WiFi communication interface.

In an example implementation, using their associated computing systems, the devices 100, 106, 112 could set their local clocks (e.g., their system clocks or clocks specifically for present purposes) to be synchronized with each other based on when one of the devices broadcasts a WiFi frame and when each other device receives that WiFi frame. For instance, the devices could set their local clocks based on when device 100 broadcasts the WiFi frame and when devices 106, 112 receive that WiFi frame. By way of example, device 100 could set its local clock to read time T=0 or another such reference time as of when device 100 broadcasts the WiFi frame, device 106 could set its local clock to read the same reference time (e.g., T=0) as of when device 106 receives that WiFi frame, and device 112 could also set its local clock to read the same reference time (e.g., T=0) as of when device 112 receives the WiFi frame.

The devices could also account for a priori information about how long it takes the devices to process such a WiFi frame For instance, device 100 could account for how long it takes device 100 to process transmission of the WiFi frame, such as how long it takes device 100 to generate and output that WiFi frame, so that device 100 can set its clock to a reference time that is when the WiFi frame leaves device 100. Likewise, device 106 could account for how long it takes device 106 to process reception of the WiFi frame, so that device 106 can set its clock to a reference time (effectively the same reference time) that is when the WiFi frame arrives at device 106, and device 112 could account for how long it takes device 112 to process reception of the WiFi frame, so that device 112 can set its clock to a reference time (effectively the same reference time) that is when the WiFi frame arrives at device 112.

The WiFi frame that device 100 broadcasts for this purpose could be a standard WiFi frame, carrying a Medium Access Control (MAC) address of device 100 and perhaps a predetermined header parameter or codeword interpretable by the other devices 106, 112 to indicate that the WiFi frame is provided for time-synchronization purposes.

In a variation of this process, a device other than one of the voice-capable devices at issue may be the one that broadcasts the WiFi frame that the multiple voice-capable devices use as a basis to synchronize their clocks, with each voice-capable device at issue receiving that frame and setting its respective clock based on its time of receipt of that frame. Still further, this time synchronization process could be repeated from time to time to help account for time drift at any of the devices.

Other mechanisms for synchronizing the devices' clocks could be possible as well. For instance, the devices may use other electromagnetic communications, such as communications according to Bluetooth, Zigbee, or other protocols. Further, if the devices are within Global Positioning System (GPS) coverage and are equipped with GPS receivers, they could use GPS signaling to synchronize their clocks with a very high degree of accuracy. Still further, while likely less accurate, the devices may alternatively use Network Time Protocol (NTP) to synchronize their clocks if they are internet-connected. Other examples may be possible as well.

As further noted above, the process of using time of receipt of the voice-command utterance 120 as a basis to control which device's associated computing system should trigger action in response to the voice-command utterance 120 could be distributed among the devices. To facilitate this as well, each device could be equipped with processing logic to help carry out this process. For instance, each device's associated computing system may include one or more processing units (e.g., digital signal processors) at the device, configured to engage in this process.

In an example implementation, using their associated computing systems, each one of the voice-capable devices that receives the voice-command utterance 120 will note the device's time of receipt of the voice-command utterance 120, using its clock that is synchronized with each of the other voice-capable devices, and will transmit (e.g., broadcast or multicast) for receipt by the computing system associated respectively with each of the other voice-capable devices a signal specifying that time of receipt. The computing system associated respectively with each given voice-capable device that receives the voice-command utterance 120 may then determine whether it receives such a signal indicating a time of receipt of the voice-command utterance 120 that is earlier than the given device's noted time of receipt of the voice-command utterance 120, i.e., whether another voice-capable device received the voice-command utterance 120 earlier than the given voice-capable device.

If the computing system associated with the given voice-capable device thereby determines that it does not receive a signal indicating a time of receipt of the voice-command utterance 120 that is earlier than the given device's noted time of receipt of the voice-command utterance 120 (i.e., that no other voice-capable device received the voice-command utterance 120 earlier than the given voice-capable device), then the computing system may trigger responsive action. Namely, based at least on that determination, the computing system of the given device may respond to the given device's receipt of the voice-command utterance 120 by triggering an action that the computing system is configured to trigger in response to the given device receiving that voice-command utterance 120.

For instance, if the voice-command utterance 120 is "Turn on the lights" and the given device is a voice-capable switch whose associated computing system is configured to send one or more control signals to turn on one or more particular lights in response to the given device receiving that voice-command utterance 120, then the given device's associated computing system may then respond to receipt of that voice-command utterance 120 by sending the one or more control signals, thus triggering turning on one the one or more particular lights.

Whereas, if the computing system associated with the given voice-capable device thereby determines that it received at least one signal indicating a time of receipt of the voice-command utterance 120 that is earlier than the given device's noted time of receipt of the voice-command utterance 120 (i.e., that at least one other voice-capable device received the voice-command utterance earlier than the given device), then the computing system may forgo triggering the responsive action. Namely, based at least on that determination, the computing system associated with the given device may forgo triggering a responsive action that the computing system is configured to trigger in response to the given device receiving that voice-command utterance 120.

For instance, even if the voice-command utterance 120 is "Turn on the lights" and the given device is a voice-capable switch whose associated computing system configured to send one or more control signals to turn on one or more particular lights in response to the given device receiving that voice-command utterance 120, the given device's associated computing system in this situation may forgo sending the one or more control signals and may thus forgo triggering triggering turning on of the one or more particular lights.

The computing system associated respectively with each device in this process could determine the device's time of receipt of the voice-command utterance 120 in various ways. In an example arrangement, for instance, as the device receives audio from its environment, the associated computing system may monitor the audio to detect the presence of voice audio in particular, such as by detecting audio that has a dynamic range known to be associated with voice and that has at least a threshold high decibel level, to distinguish it from ambient noise. Further, as noted above, the computing system may apply speech processing to the detected voice, to determine if the detected voice is a predefined voice command in response to which the computing system is configured to trigger responsive action.

With this arrangement, each device's associated computing system could determine the device's time of receipt of the voice-command utterance 120 as a time when device started detecting audio that was of the threshold decibel level, provided that the computing system then determines that the audio represents the voice-command utterance 120. In other examples, the devices could all determine their time of receipt of the voice command instead at another common occurrence (the same for each device), such as at the start of a voice-command utterance 120 following a wakeup utterance like "Hey device!" or the like, or, if practical, at the end of the voice-command utterance 120, among other possibilities.

As each device's associated computing system determines the device's time of receipt of the voice-command utterance 120, the computing system could then generate and transmit for receipt by each other voice-capable device a signal that specifies the determined time of receipt. This signal could take various forms, making use of any of a variety of communication protocols.

By way of example, if the devices are WiFi-equipped as discussed above, each device's associated computing system could broadcast or multicast a WiFi frame that carries the device's MAC address and a specification of the device's determined time of receipt of the voice-command utterance 120. Further, each device's associated computing system could monitor for the presence of such WiFi frames transmitted by the computing system associated with one or more other of the voice-capable devices, and upon detecting and receiving such a WiFi frame, could read the frame to determine when the other device received the voice-command utterance 120. As another example, the devices' associated computing systems could similarly exchange their time-of-receipt determinations using other wireless protocols such as Bluetooth, Zigbee, or the like. Still further, as another example, if the devices and/or their associated computing systems are otherwise networked together, possibly through an access point or hard-wired network, they may exchange their time-of-receipt determinations through network communication with each other.

To facilitate this process, the computing system associated with each device that receives the voice-command utterance 120 may wait a predefined amount of time before triggering the action that the computing system is configured to trigger in response to the device receiving the voice-command utterance 120. This predefined amount of time could be set to be sufficient to allow time for the computing system to receive from the computing system associated with any other device of the multiple devices a signal indicating time of receipt of the voice command by the other device. For instance, this wait time could be on the order of tens of milliseconds, among other possibilities.

In practice, if two or more voice-capable devices that are relatively nearby each other each receive a voice-command utterance at around the same time as each other, it may be likely that all of voice-capable devices received the same voice-command utterance as each other—i.e., a given instance of a voice command being spoken by a person in earshot of the multiple devices. However, to help ensure that this is the case for present purposes, the computing systems associated with the voice-capable devices could also engage in signaling with each other to help confirm that the voice-capable deices received the same voice-command utterance 120 as each other, as a basis for the computing systems engaging in the present control process based on time of receipt of the voice-command utterance 120.

By way of example, when a given device receives a voice-command utterance, the device's associated computing system may include, in the signal that it transmits for receipt by each other voice-capable device, data that indicates the received voice-command utterance 120 in a manner that would allow each other device's associated computing system to determine if the voice-command utterance 120 is the same voice-command utterance 120 that the other device received. For instance, this data could be a hash value computed algorithmically based on the received voice-command utterance 120 so that, by applying the same hashing algorithm, each device would compute the same hash value from the same voice-command utterance 120. Alternatively, the data could be a digital fingerprint of the received voice-command utterance 120, or a code value designating the voice-command utterance 120 selected from a predefined list of voice-command utterances that the devices are configured to receive, among other possibilities.

In determining whether at least one of the other devices of the multiple devices received the voice-command utterance 120 earlier than the given device did, the given device's associated computing system could thus determine, based on such a signal that it receives from the other device's associated computing system, whether the voice-command utterance that the other device received is the same as the voice-command utterance 120 that the given device received. And if so, then, based at least in part in part on that determination, the given device's associated computing system could implement the present process of using time of receipt as a basis to control whether to trigger the action that it is configured to trigger in response to the given device having received the voice-command utterance 120. Whereas, if not, then, based at least on that determination, the given device's associated computing system may forgo carrying out the present process using time of receipt as a basis to control whether to trigger the action that it is configured to trigger in response to the given device having received the voice-command utterance 120

In another example implementation, as noted above, rather than carrying out the present process with distributed processing among the voice-capable devices, the process could be carried out with a centralized computing system.

This centralized computing system could be separate from the computing systems associated with the various devices or could be at least in part the computing system associated with a given one of the multiple devices, among other possibilities. For instance, the centralized computing system could be a cloud-based computing system with which the various devices' associated computing systems are capable of communicating. Alternatively, if the various devices are located in a given customer premises, the centralized computing system could be located within that customer premises. Other arrangements are possible as well.

With a version of this alternative implementation as noted above, as each voice-capable device receives the voice-command utterance, the device's associated computing system could inform the centralized computing system of the device's determined time of receipt of the voice command, and could provide an indication of the voice-command utterance 120 in the manner noted above.

The centralized computing system could then determine if the devices received the same voice-command utterance as each other as discussed above. Further, the centralized computing system could compare the indicated times of receipt of the voice-command utterance 120 at the various devices and could thereby determine which device received the voice-command utterance 120 first.

The centralized computing system could then responsively signal to that winning device's associated computing system to cause that device's associated computing system to trigger the action that it is configured to trigger in response to the device receiving the voice-command utterance 120. Further, the centralized computing system may also responsively signal to each other device's associated computing system to cause each other device's associated computing system to forgo triggering the actin that it is configure to trigger in response to its device receiving the voice-command utterance 120. Or each other device's associated computing system could forgo taking that action in response to not receiving from the centralized computing system a signal directing it to do so.

Figure 2A:
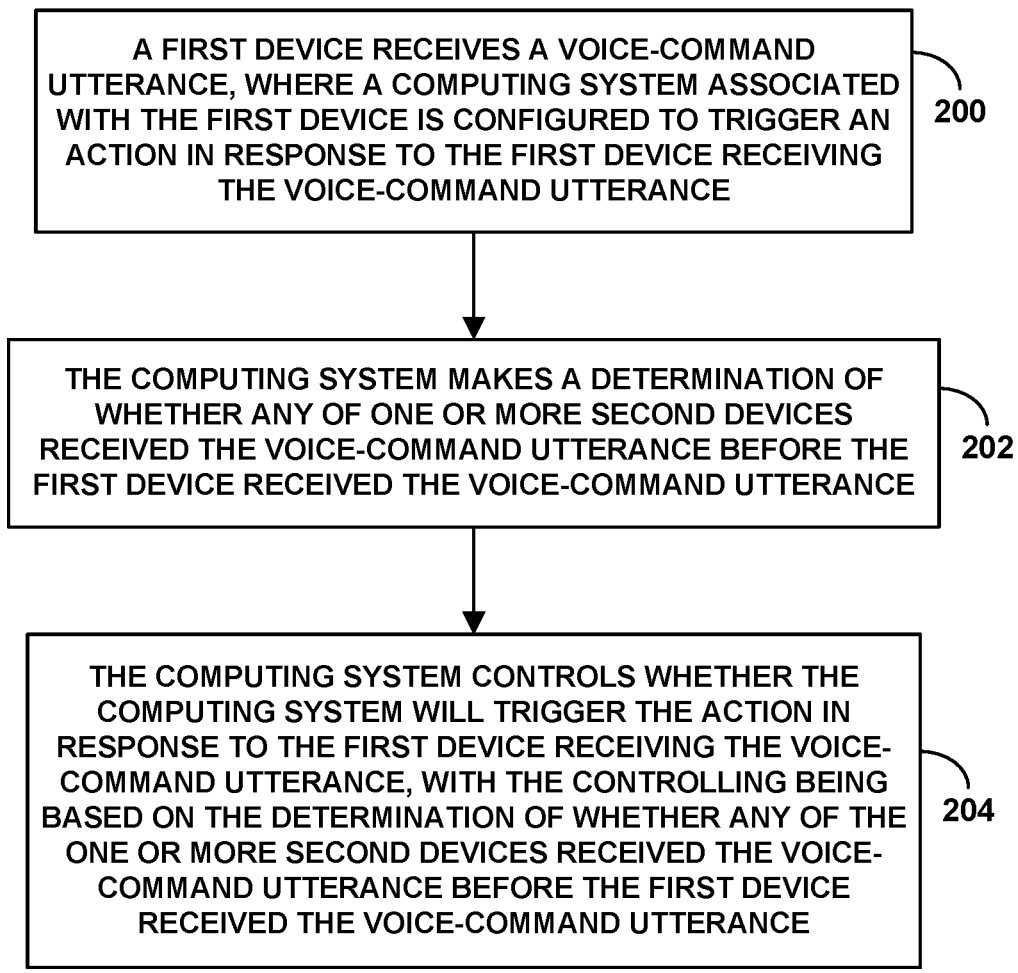
FIG. 2A is a flow chart illustrating an example method.

FIG. 2A is next a flow chart illustrating an example method that could be carried out in accordance with the present disclosure, for controlling response to a voice-command utterance. As shown in FIG. 2A, the method includes, at block 200, a first device receiving the voice-command utterance (e.g., through a microphone of the first device), in a scenario where a computing system associated with the first device is configured to trigger an action in response to the first device receiving the voice-command utterance. Further, the method then includes carrying out operations at blocks 202 and 204 upon the first device receiving the voice-command utterance. Namely, at block 202, the method includes the computing system making a determination of whether any of one or more second devices received the voice-command utterance before the first device received the voice-command utterance. And at block 204, the method includes the computing system controlling whether the computing system will trigger the action in response to the first device receiving the voice-command utterance, with the controlling being based on the determination of whether any of the one or more second devices received the voice-command utterance before the first device received the voice-command utterance.

In line with the discussion above, the controlling in this method could include (i) if the determination is that no other device of the one or more second devices received the voice-command utterance before the first device received the voice-command utterance, then triggering by the computing system the action in response to the first device receiving the voice-command utterance and (ii) if the determination is that at least one of the one or more second devices received the voice-command utterance before the first device received the voice-command utterance, then forgoing by the computing system triggering of the action in response to the first device receiving the voice-command utterance.

In addition, as discussed above, the method could include synchronizing a time clock of the first device with a time clock respectively of each of the one or more second devices in a manner that facilitates the determination of whether any of the one or more second devices received the voice-command utterance before the first device received the voice-command utterance. For instance, the synchronizing could include engaging in electromagnetic signaling (e.g., WiFi signaling) between the first device and at least one of the one or more second devices, with the electromagnetic signaling establishing a common reference time at the first device and the at least one of the one or more second devices.

Further, in the illustrated method, the determination of whether any of the one or more second devices received the voice-command utterance before the first device received the voice-command utterance could be considered a first determination, and the method could additionally include recording by the first device a time of receipt of the voice-command utterance by the first device.

Figure 2B:
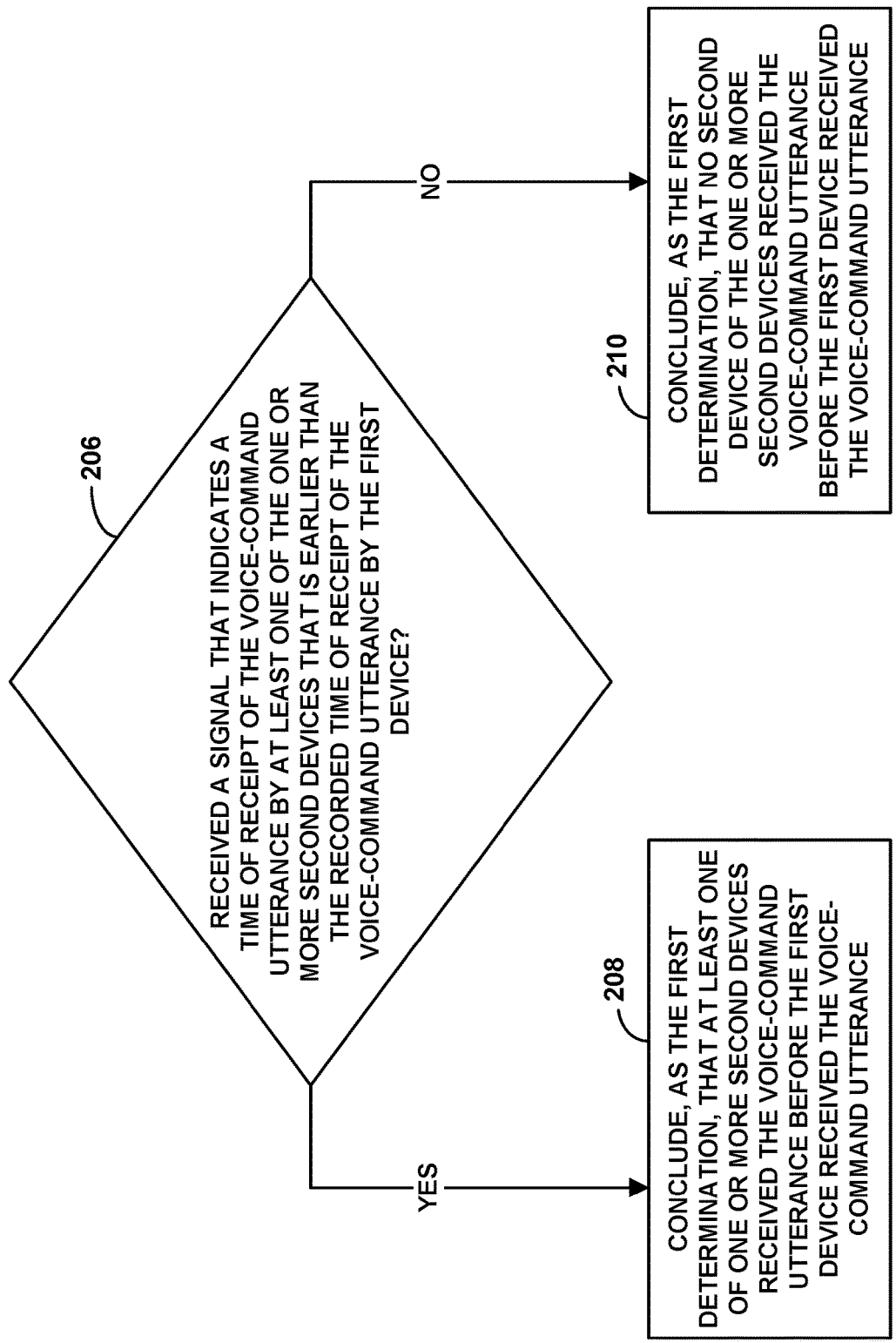
FIG. 2B is another flow chart illustrating an example method.

In that case, the act of making the first determination could involve considering whether the computing system received a signal that indicates an earlier time of receipt of the voice-command utterance by any other device. FIG. 2B illustrates an example of this process, which could be part of the method illustrated by FIG. 2A.

Namely, as shown in FIG. 2B, at block 206, the method could further include making a second determination of whether the computing system received a signal that indicates a time of receipt of the voice-command utterance by at least one of the one or more second devices that is earlier than the recorded time of receipt of the voice-command utterance by the first device. Further, if the second determination is affirmative, then, at block 208, the method could include, based at least on the second determination, concluding, as the first determination, that at least one of one or more second devices received the voice-command utterance before the first device received the voice-command utterance. Whereas, if the second determination is negative, then, at block 210, the method could include, based at least on the second determination, concluding, as the first determination, that no second device of the one or more second devices received the voice-command utterance before the first device received the voice-command utterance.

In addition, the act of making the second determination of whether the computing system received a signal that indicates a time of receipt of the voice-command utterance by at least one of the one or more second devices that is earlier than the noted time of receipt of the voice-command utterance by the first device could further include the computing system determining whether the voice-command utterance received by the first device represents a same voice command as the voice-command utterance received by the at least one of the one or more second devices.

Still further, as noted above, the first device and each of the one or more second devices could be controlling devices, and the action could include controlling one or more control targets. For instance, the first device and each of the one or more second devices could be switches, and the action could involve controlling one or more lights, among other possibilities.

Figure 3:
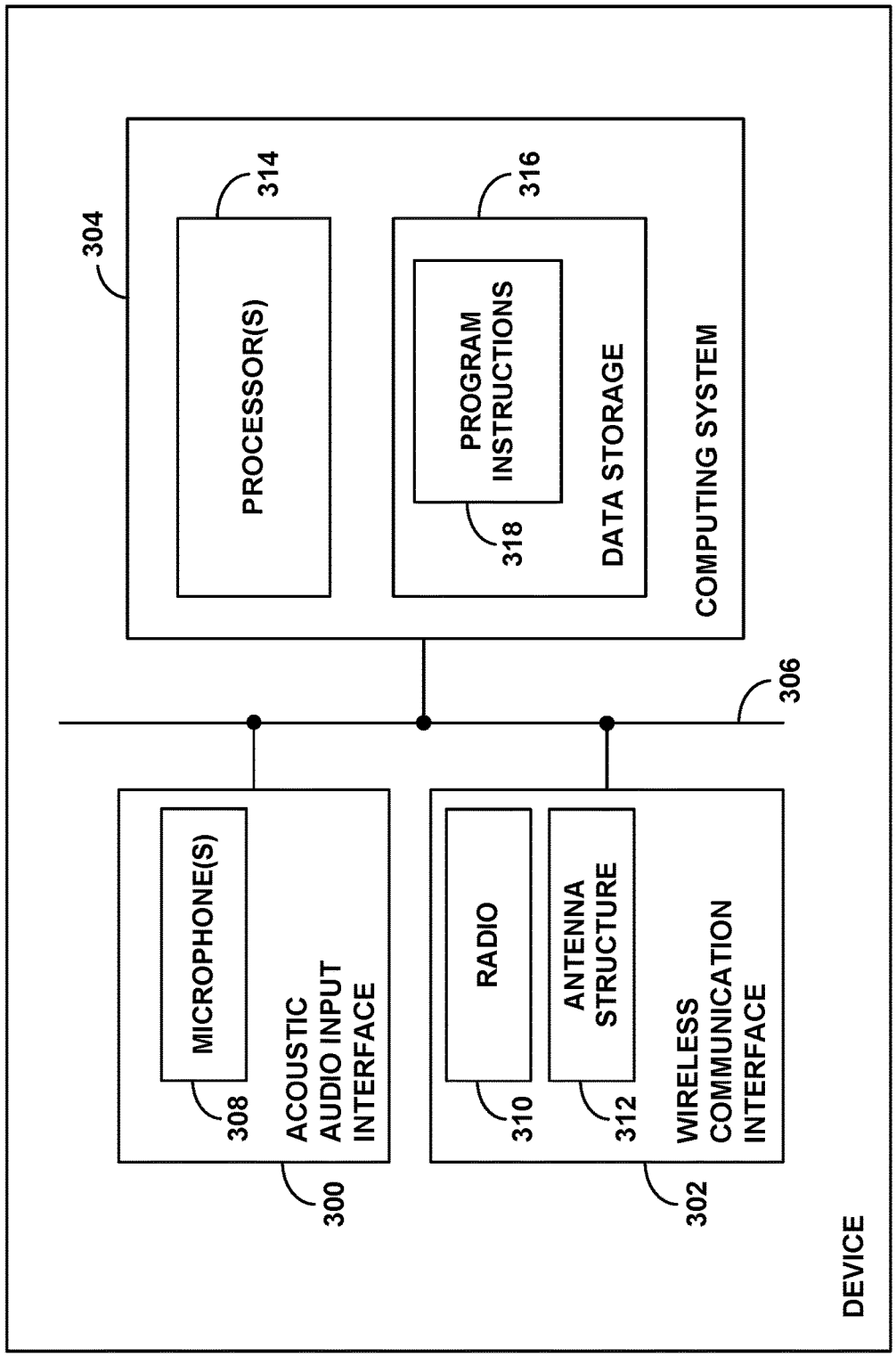
FIG. 3 is a simplified block diagram of an example device.

FIG. 3 is next a simplified block diagram of an example device, which could represent one of the voice-capable devices discussed above, among other possibilities. As shown in FIG. 3, the example device includes an acoustic audio input interface 300, a wireless communication interface 302, and a computing system 304, which could be integrated together and/or communicatively linked with each other by a system bus or other connection mechanism 306.

The acoustic audio input interface 300 may comprise one or more microphones 308 (e.g., a single microphone or a microphone array) configured to receive audio from an environment of the device, including possibly voice-command utterances. These microphones may be configured to provide analog or digital representations of the received audio. Further, the acoustic audio input interface 300 may additionally include an analog-digital conversion circuitry (not shown) for converting received analog audio input to a digital representation for processing by the computing system 304.

The wireless communication interface 302 may comprise one or more components to facilitate electromagnetic communication with one or more other devices. For instance the wireless communication interface 302 could include a radio 310 and an antenna structure 312, cooperatively configured to facilitate electromagnetic communication according to one or more air-interface protocols, such as WiFi, Bluetooth, Zigbee, or others.

The computing system 304 may comprise one or more processors 314, non-transitory data storage 316 (e.g., optical, magnetic, or flash storage, RAM, ROM, EPROM, EEPROM, cache memory, and/or other computer-readable media, etc.), and program instructions 318 stored in the non-transitory data storage 316 and executable by the one or more processors 314 to carry out various operations described herein, among other possibilities. Without limitation, for instance, these operations could include, upon receipt by the first device of a voice-command utterance through the microphone, (i) making a determination of whether any of one or more second devices received the voice-command utterance before the first device received the voice-command utterance, and (ii) controlling whether to trigger an action in response to the first device receiving the voice-command utterance, wherein the controlling is based on the determination of whether any of the one or more second devices received the voice-command utterance before the first device received the voice-command utterance.

In an example implementation, the computing system 304 may include a voice-recognizer module such as an application specific integrated circuit (ASIC) configured specifically for detecting utterance of a predefined wakeup phrase and may further include a programmed digital signal processor (DSP) for carrying out various further processing operations. Further, the computing system 304 may also include or interwork with one or more computing-system components separate from the voice-capable device.

Various features discussed elsewhere herein could be implemented in this context as well, and vice versa.

Figure 4:
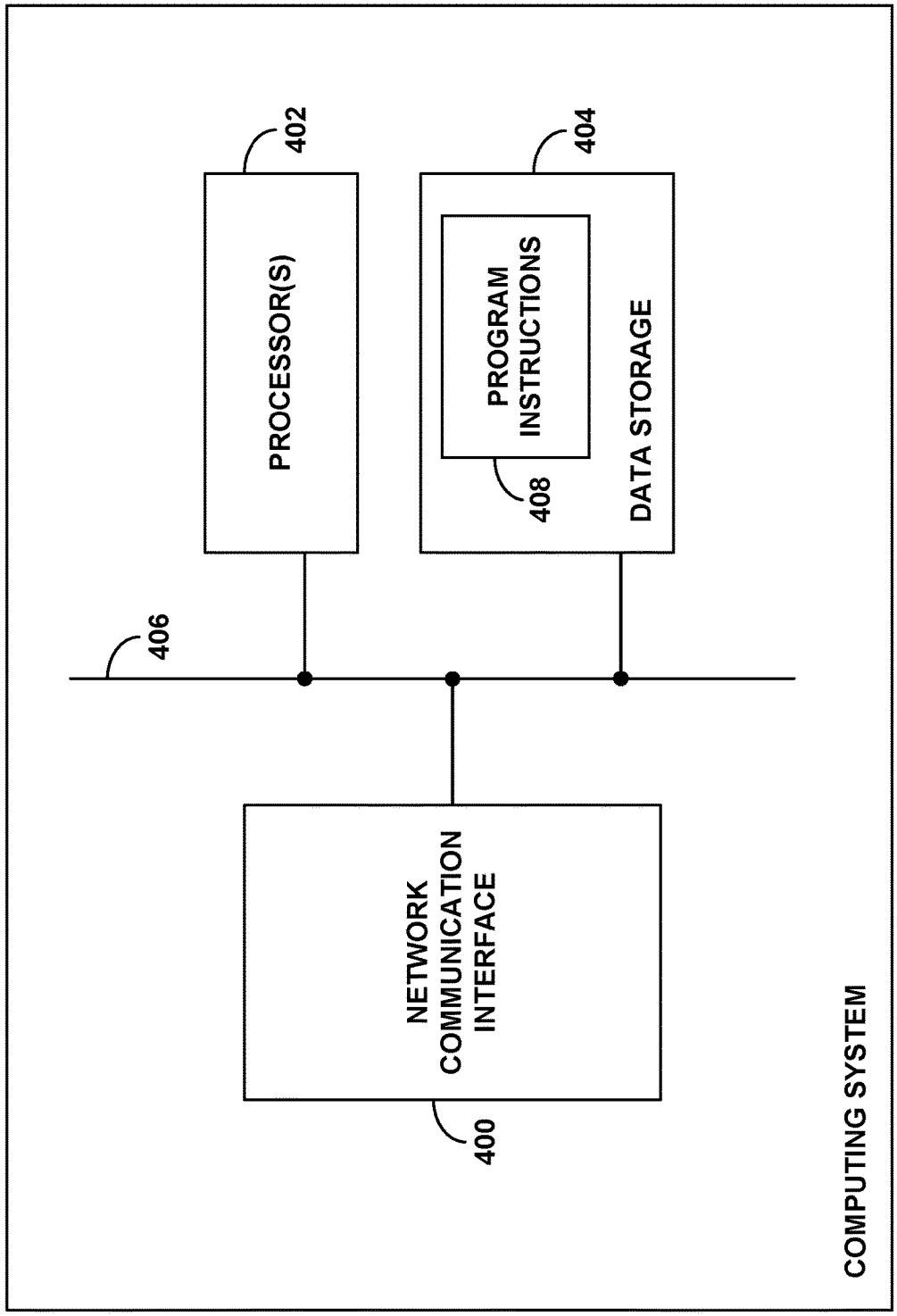
FIG. 4 is a simplified block diagram of an example computing system.

FIG. 4 is next a simplified block diagram of an example computing system. This computing system could be provided within a representative voice-capable device and/or within a separate device or system, including possibly a cloud-based system. As shown, the example computing system includes a network communication interface 400, one or more processors 402, and non-transitory data storage 404, which could be integrated together and/or communicatively linked with each other by a system bus or other connection mechanism 406.

The network communication interface 400 could comprise one or more components that would enable the computing system to engage in ad hoc or other network communication with one or more devices or systems. For instance, the network communication interface 400 could comprise a wired network interface module such as an Ethernet module and/or a wireless communication interface such as a cellular and/or short-range wireless communication interface, among other possibilities.

The one or more processors 402 could comprise one or more general purpose processors (e.g., microprocessors) and/or one or more special-purpose processors (e.g., DSPs, ASICs, etc.) Further, the non-transitory data storage 404 could comprise one or more storage components such as optical, magnetic, or flash storage, RAM, ROM, EPROM, EEPROM, cache memory, and/or other computer-readable media, etc., and could store program instructions 408 executable by the one or more processors 402 to carry out various operations discussed herein.

Various features discussed elsewhere herein could be implemented in this context as well, and vice versa.

Further, the present disclosure also separately contemplates at least one non-transitory computer-readable medium (e.g., optical, magnetic, or flash storage, RAM, ROM, EPROM, EEPROM, cache memory, and/or other computer-readable media, etc.) encoded with, embodying, or otherwise storing program instructions executable by at least one processor to carry out various operations as described herein.

Exemplary embodiments have been described above. Those skilled in the art will understand, however, that changes and modifications may be made to these embodiments without departing from the true scope and spirit of the invention.

What is claimed is:

1. A method for controlling which of multiple devices will respond to a voice-command utterance, wherein each device of the multiple devices has one or more respective microphones configured to receive audio, the method comprising:
    at each given device of the multiple devices, (i) receiving the voice-command utterance through the device's one or more microphones, and (ii) determining a respective time of receipt of the voice-command utterance by the given device;
    exchanging with each other, by the multiple devices, their determined respective times of receipt of the voice-command utterance;
    based on the exchanging, determining, by each given device of the multiple devices, whether any other device of the multiple devices received the voice-command utterance earlier than the given device; and
    controlling, by each given device of the multiple devices, whether the given device will trigger action in response to the voice-command utterance, wherein the controlling includes (i) if the given device determines based on the exchanging that no other device of the multiple devices received the voice-command utterance earlier than the given device, then the given device triggering action in response to the voice-command utterance, and (ii) if the given device determines based on the exchanging that any other device of the multiple devices received the voice-command utterance earlier than the given device, then the given device forgoing triggering of action in response to the voice-command utterance.

2. The method of claim 1, wherein exchanging with each other, by the multiple devices, their determined respective times of receipt of the voice-command utterance comprises each given device of the multiple devices transmitting for receipt by each other device of the multiple devices a respective signal indicating the respective time of receipt of the voice-command utterance by the given device.

3. The method of claim 2, wherein transmitting for receipt by each other device of the multiple devices the respective signal indicating the respective time of receipt of the voice-command utterance by the given device comprises broadcasting or multicasting the respective signal.

4. The method of claim 2, further comprising including by each given device, in the respective signal that the given device transmits for receipt by each other device of the multiple devices, data that indicates the received voice-command utterance in a manner that enables each other device of the multiple devices to determine that the voice-command utterance received by the given device is the same voice-command utterance as received by the other device.

5. The method of claim 4, wherein the data is selected from the group consisting of (i) a hash value computed algorithmically based on the voice-command utterance received by the given device and (ii) a digital fingerprint of the voice-command utterance received by the given device.

6. The method of claim 4, wherein the determining of whether any other device of the multiple devices received the voice-command utterance earlier than the given device and the controlling whether the given device will trigger action in response to the voice-command utterance are responsive to determining that at least one other device of the multiple devices received the same voice-command utterance as the given device.

7. The method of claim 2, wherein determining by the given device, based on the exchanging, whether any other device of the multiple devices received the voice-command utterance earlier than the given device comprises:
    waiting, by the given device a predefined amount of time to receive from at least one other device of the multiple devices the respective signal of the other device reporting the respective time of receipt of the voice-command utterance by the other device.

8. The method of claim 1, further comprising the multiple devices engaging in wireless signaling with each other to synchronize clocks of the devices in order to facilitate each given device determining, based on the exchanging, of whether any other device of the multiple devices received the voice-command utterance earlier than the given device.

9. The method of claim 1, wherein each device of the multiple devices is a controlling device, and wherein triggering action in response to the voice-command utterance comprises controlling one or more control targets.

10. The method of claim 1, wherein each device of the multiple devices is a switch, and wherein triggering action in response to the voice-command utterance comprises controlling one or more lights.

11. A system comprising multiple devices each having one or more respective microphones configured to receive audio, wherein the multiple devices are cooperatively configured to facilitate controlling which of the multiple devices will respond to a voice-command utterance, including:
    each given device of the multiple devices being configured to receive the voice-command utterance through the device's one or more microphones and to determine a respective time of receipt of the voice-command utterance by the given device,
    the multiple devices being configured to exchange with each other their determined respective times of receipt of the voice-command utterance, and
    each given device of the multiple devices being configured (a) to determine, based on the exchanging, whether any other device of the multiple devices received the voice-command utterance earlier than the given device and (b) to control whether the given device will trigger action in response to the voice-command utterance, wherein the controlling includes (i) if the given device determines based on the exchanging that no other device of the multiple devices received the voice-command utterance earlier than the given device, then the given device triggering action in response to the voice-command utterance, and (ii) if the given device determines based on the exchanging that any other device of the multiple devices received the voice-command utterance earlier than the given device, then the given device forgoing triggering of action in response to the voice-command utterance.

12. The system of claim 11, wherein the multiple devices exchanging with each other their determined respective times of receipt of the voice-command utterance comprises each given device of the multiple devices transmitting for receipt by each other device of the multiple devices a respective signal indicating the respective time of receipt of the voice-command utterance by the given device.

13. The system of claim 12, wherein transmitting for receipt by each other device of the multiple devices the respective signal indicating the respective time of receipt of the voice-command utterance by the given device comprises broadcasting or multicasting the respective signal.

14. The system of claim 12, wherein the multiple devices being cooperatively configured to facilitate controlling which of the multiple devices will respond to a voice-command utterance further includes:

each given device being configured to include, in the respective signal that the given device transmits for receipt by each other device of the multiple devices, data that indicates the received voice-command utterance in a manner that enables each other device of the multiple devices to determine that the voice-command utterance received by the given device is the same voice-command utterance as received by the other device.

15. The system of claim 14, wherein the data is selected from the group consisting of (i) a hash value computed algorithmically based on the voice-command utterance received by the given device and (ii) a digital fingerprint of the voice-command utterance received by the given device.

16. The system of claim 14, wherein the determining of whether any other device of the multiple devices received the voice-command utterance earlier than the given device and the controlling whether the given device will trigger action in response to the voice-command utterance are responsive to determining that at least one other device of the multiple devices received the same voice-command utterance as the given device.

17. The system of claim 11, wherein the given device determining, based on the exchanging, whether any other device of the multiple devices received the voice-command utterance earlier than the given device comprises:

the given device waiting a predefined amount of time to receive from at least one other device of the multiple devices the respective signal of the other device reporting the respective time of receipt of the voice-command utterance by the other device.

18. The system of claim 11, wherein the multiple devices have synchronized clocks to facilitate each given device determining, based on the exchanging, of whether any other device of the multiple devices received the voice-command utterance earlier than the given device.

19. The system of claim 11, wherein each device of the multiple devices is a controlling device, and wherein triggering action in response to the voice-command utterance comprises controlling one or more control targets.

20. The system of claim 11, wherein each device of the multiple devices is a switch, and wherein triggering action in response to the voice-command utterance comprises controlling one or more lights.

* * * * *